though ce

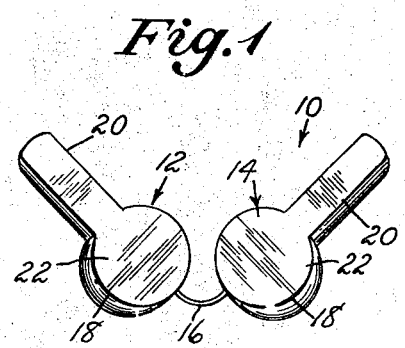
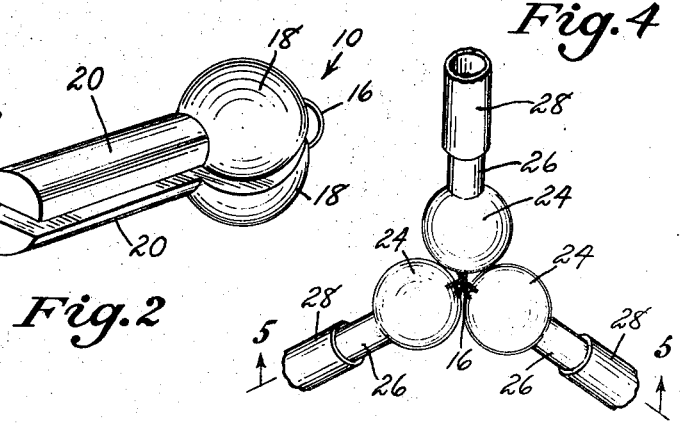
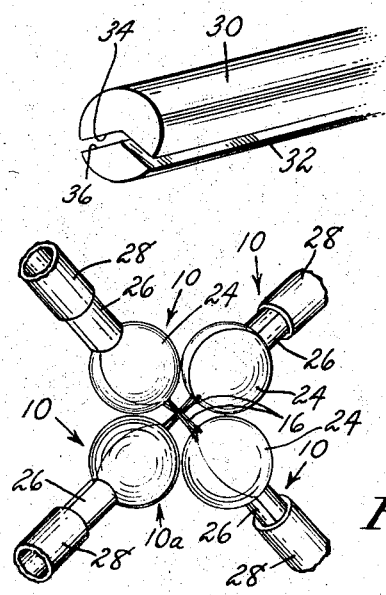
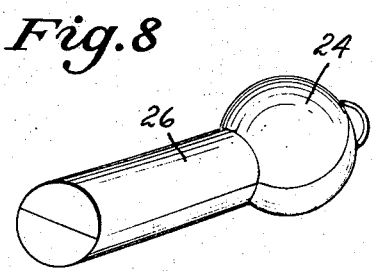
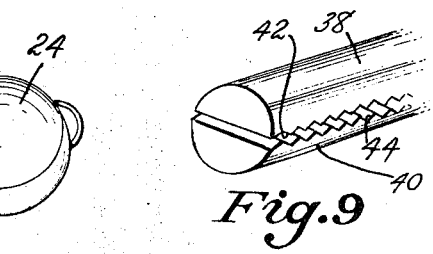
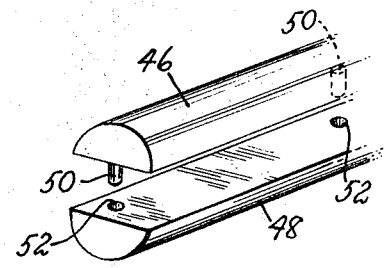
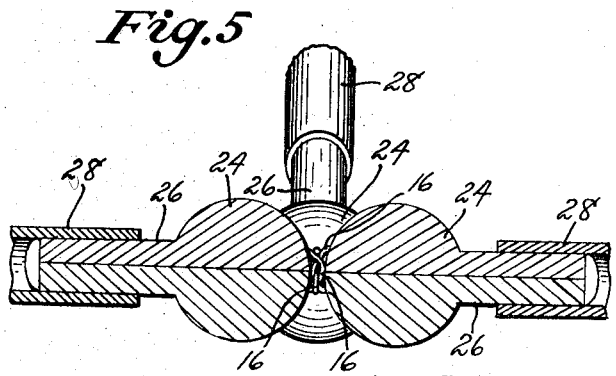

United States Patent Office 3,554,584
Patented Jan. 12, 1971

3,554,584
CONNECTOR ASSEMBLIES FOR MODELS AND THE LIKE
George C. Brumlik, 154 Upper Mountain Ave., Montclair, N.J. 07042
Filed June 26, 1969, Ser. No. 836,698
Int. Cl. F16b 7/00
U.S. Cl. 287—54      9 Claims

ABSTRACT OF THE DISCLOSURE

A connector assembly comprises a group of connector elements interconnected by flexible looped straps. Each connector element has an elongated portion adapted to receive and mount one end of a tubing or rod connectors constituting the body of a model or the like, the elongated portions each terminating in a generally spherical portion. The connecting straps maintain the surfaces of the cylindrical portions pressed together and the latter cause the elongated portions to orient themselves in such a manner that the elongated connectors project from a common center forming polyhedral angles with each other.

---

In the construction of frame models, geodesic dome structures and the like, coupling elements are commonly employed to interconnect the ends of the rods or arm sections making up the body of the structure. These coupling elements are normally constructed to mount the arm sections so that the latter project therefrom at selected angles. Since the structures being assembled ordinarily require symmetry, the coupling elements are often arranged to mount the arm sections so that the structures take the form of angular polyhedra.

In my United States Pat. No. 3,333,349, issued Aug. 1, 1967, for example, there is shown framework molecular model assemblies in which arm sections are mounted upon coupling elements intended to represent atomic valence clusters. The coupling elements are formed of metal arm sections joined end to end at the center of the element, and projecting from the center at selected angles to form a polyhedron arrangement. This arrangement requires a different set of coupling elements for each different structure to be assembled, that is to say a coupling element with three arm sections is required to form a pyramid, a coupling element with four arm sections is required to form a tetrahedron, etc. In addition, the angles between the arms vary as the number of arm sections changes.

It is an object of the present invention to provide a coupling assembly for mounting the ends of rods or arm sections of models or the like, which can be furnished to the user in the form of separate, individual components which are assembled by the user to obtain selected polyhedral figures, or other figures.

Another object of the invention is the provision of a coupling assembly of the type described which can be selectively assembled to mount a variable and practically limitless number of elongated rods or members for projection from a common center.

Still another object of the invention is the provision of a coupling assembly of the type described, in which the construction of the coupling components is such that upon assembly of the components an equiangular polyhedron may be automatically formed.

A further object of the invention is the provision of a coupling assembly of the type described which is composed of similar or identical components which are economically manufactured and which can be assembled together to provide a wide variety of assemblies, thereby diminishing the cost of the entire model or structure, and at the same time permitting the building of an infinite variety of structures.

In accordance with the invention, there is provided a connector assembly comprising a plurality of identical connector elements, each connector element including an elongated portion adapted at one end to receive and mount one end of a rod or arm section of the model to be formed, and an enlarged end portion integral with the other end of said elongated portion. A plurality of flexible straps connected to the enlarged end portions are interconnected in the form of crossed loops, these straps being sized to urge the surfaces of the enlarged end portions of the connector elements into firm engagement with each other. If the straps are sufficiently tight and the enlarged ends have spherical surfaces, the connector elements are automatically turned to provide equal angles between the respective elongated portions.

Additional objects and advantages of the invention will become apparent during the course of the following specification when taken in connection with the accompanying drawings, in which:

FIG. 1 is a plan view of a connector element made in accordance with the invention and consisting of a pair of half sections joined by a flexible strap, and shown in separated condition;

FIG. 2 is a perspective view of the connector element of FIG. 1 with the half-sections shown about to be assembled;

FIG. 3 is a perspective view of the connector element of FIGS. 1 and 2, shown is assembled condition;

FIG. 4 is a plan view of a connector assembly formed of three of the units shown in FIGS. 1–3;

FIG. 5 is an enlarged section taken along line 5—5 of FIG. 4;

FIG. 6 is a plan view of three connector elements with their half sections shown in separated condition and arranged to be assembled into the form shown in FIG. 4;

FIG. 7 is a plan view of another structure formed by an assembly of a group of four connector elements of the type shown in FIGS. 1–3; and FIGS. 8–10 are partial perspective views similar to FIG. 2 but showing modified types of connector elements.

Referring in detail to the drawings, and particularly to FIG. 1, there is shown a connector element 10 made in accordance with the present invention and comprising a pair of complementary half-sections 12 and 14 joined together by a flexible strap 16. In the form of the invention shown, the element 10 is preferably molded from plastic with the strap 16 formed integrally with the half sections 12 and 14. It is to be understood, however, that the half sections 12 and 14 may be made of metal or other suitable material and the strap may be made of metal wire and joined to the half sections in any suitable manner, as by pins or the like.

The half sections 12 and 14 are identical construction, each comprising a hemispherical portion 18 and an elongated semicylindrical portion 20 extending radially therefrom. The half sections 12 and 14 also have matching flat surfaces 22. The strap 16 joins the hemispherical portions 18 at the points thereof diametrically opposed to the semicylindrical portions 20. The half sections may be fitted together in the manner shown in FIGS. 2 and 3, with their flat surfaces 22 in abutment and cemented together to form the completed connector element 10. In this assembled condition, the matching hemispherical portions 18 form a spherical end 24 and the matching semicylindrical portions 20 form an elongated cylindrical portion 26. The strap 16 assumes the form of a closed loop, the ends of which are integral with the respective halves of the spherical end portion 24.

The assembled cylindrical portion 26 is sized to fit frictionally within and retain an elongated tubular rod or arm section 28 which constitutes one of the body elements of the model or structure defined by the connector elements.

FIGS. 4 and 5 show three connector elements 10 assembled together to form a triangular plane figure. In achieving this figure, the three connector elements 10 in their original split form are placed one upon the other with their straps 16 crossing, in the manner shown in FIG. 6. The half sections of the connector elements 10 are then cemented together to form the three assembled connector elements 10. In assembling the connector elements, the straps 16 are interconnected in the form of loops.

If the loops formed by the interconnected straps 16 are sufficiently tight, and if the end portions 24 of the connector elements are made spherical as shown, the interconnected elements will automatically form an equiangular polyhedral figure. Thus, the straps 16 may be sized in proportion to the diameter of the spherical portions in such a manner that the interconnected loops draw tightly against each other, pulling the spherical portions of all the interconnected coupling elements into firm abutment with each other.

FIG. 7 shows, for example, four coupling elements 10 interconnected in the manner described above. If the looped straps 16 in the position of FIG. 7 are sufficiently tight, they will cause the spherical portions 24 to rotate upon each other in such a manner as to orient the cylindrical portions 26 (and the rods 28 carried thereby) at equal angles relative to each other. In the form shown in FIG. 7, the coupling elements 10 will form a tetrahedron, and when tubular rods 28 are mounted in the cylindrical portions 26, the angle between each adjacent pair of rods will be 109°. This angle is automatically attained, it being understood that the spherical portions 26 and interlocked straps 16 cooperate to provide equal angles between the mounted rods 28. If another coupling element 10 is added to the arrangement of FIG. 7, the assembly will automatically change to define a trigonal bipyramid.

It is not essential, however, that the end portions of the connectors be made spherical, and these portions may be made of various other shapes, and even faceted. In addition, the elongated portions need not be cylindrical but may have square or other cross sections, as long as they correspond to the cross-sections of the tublar rods or arm sections to be received thereon. It will also be appreciated that the cylindrical portions 26 may be made hollow in tubular form and the rods 28 may be made solid to fit within these tubular cylindrical portions.

In some instances, it may be desirable to make the end portions of the coupling elements of shapes other than cylindrical or to make the straps 16 of a longer length so that they do not interengage tightly. In these instances, the coupling elements 10 will not automatically arrange themselves in the form of equiangular polyhedra, and the elements can be manually adjusted to assume whatever angles are desired by the user.

While it has been previously suggested that the half-sections 12 and 14 of the element 10 may be cemented together, it will be appreciated that if the tubular arm section is made to fit tightly over the cylindrical portion 26 of the assembled element 10, the arm section 28 will itself hold the assembled element together, without the necessity for cementing. This is advantageous in that the tubular arm sections 28 can be removed when desired, and the split coupling elements 10 opened up and reused to form different figures.

FIG. 8 shows one form in which the cylindrical portion of connector element 10 may take if the tubular arm sections are to be used as the sole means to hold together the assembled connector elements. The half sections 30 and 32 of the cylindrical portion are formed with confronting wedge-shaped faces 34 and 36 which interfit when the half sections are brought together and covered by a tubular rod 28. The wedge-shaped surfaces 34 and 36 prevent lateral relative movement of the interfitting sections 30 and 32.

FIG. 9 shows another form which the solid cylindrical portion of the connector element 10 may take. In this view, the cylindrical half sections 38 and 40 are formed with serrated confronting faces 42 and 44, which intermesh to prevent longitudinal relative movement of the half sections 38 and 40.

FIG. 10 shows cylindrical half sections 46 and 48, the confronting surfaces of which are respectively formed with pins 50 and bores 52 which receive the pins 50 to prevent both lateral and longitudinal movement of the half sections 46 and 48 when the latter are assembled.

As an important feature of the invention, the connecting straps 16 may be made of rubber or other elastomeric or stretchable material, or in the form of a spring. When the straps 16 are made stretchable as well as flexible, they will apply sufficient tension to the connector elements 10 to form regular polyhedra, regardless of the number of connector elements in the assembly.

There is thus provided a coupling construction by means of which a selectively variable, and practically limitless number of elongated rods or arm sections can be connected rigidly or flexibly to a common center and project therefrom at selected angles. In addition, if the straps and the spherical portions are dimensioned as described, the connecting elements will adjust themselves to provide equiangular polyhedra.

While preferred embodiments of the invention have been shown and described herein, it is obvious that numerous additions, changes and omissions may be made in such embodiments without departing from the spirit and scope of the invention.

What is claimed is:

1. A connector assembly for mounting elongated arm sections of a framework model or the like, said assembly comprising a plurality of interengaging connector elements, each of said elements including an elongated portion adapted to receive and mount an arm section of the model being constructed, and an enlarged end portion integral with said elongated portion, and a plurality of flexible looped straps each connected to a respective enlarged end portion and interlooped with each other at a common center to urge the enlarged end portions of said plurality of connector elements into engagement with each other, with said elongated portions projecting radially from said common center, said end portions being enlarged symmetrically about said common center so as to abut each other at points equidistant from said center and thus provide for automatic angle equalization between the elongated portions.

2. A connector assembly according to claim 1 in which the enlarged ends of said connector elements are spherical, and in which said flexible straps urge said spherical end portions together into sufficiently firm engagement to cause relative rotation of said connector elements to positions in which the elongated portions define a regular polyhedron.

3. A connector assembly according to claim 2 in which the connector elements in each pair and the connecting strap therefor are molded integrally of plastic material.

4. A connector assembly according to claim 2 in which each of said connector elements is formed of two complementary, longitudinally-divided half sections connected by a flexible strap.

5. A connector assembly according to claim 4 in which each half section comprises a semicylindrical section and an integral hemispherical section, which fit together respectively to form an elongated, cylindrical portion and a spherical end portion, said flexible strap interconnecting said hemispherical sections.

6. A connector assembly according to claim 5 in which said arm section comprises a tubular member which fits frictionally upon said cylindrical portion, and holds said half sections together in assembled condition.

7. A connector assembly according to claim 6 in which the confronting surfaces of the semicylindrical sections are made of irregular shapes to prevent relative movement between the assembled semicylindrical sections.

8. A connector assembly according to claim 7 in which the confronting surfaces of said semicylindrical sections are serrated.

9. A connector assembly according to claim 2 in which said flexible straps are made stretchable.

References Cited

UNITED STATES PATENTS

| 2,206,149 | 7/1940 | Balinkin | 35—18.5UX |
| 3,422,565 | 1/1969 | Kentfield et al. | 46—29X |

FOREIGN PATENTS

| 4,568 | 7/1912 | Great Britain | 46—29 |
| 285,791 | 10/1928 | Great Britain | 35—18.5 |
| 700,630 | 12/1940 | Germany | 46—29 |

DAVID J. WILLIAMOWSKY, Primary Examiner

A. V. KUNDRAT, Assistant Examiner

U.S. Cl. X.R.

35—18